April 1, 1930.  I. COWLES  1,752,976
FLEXIBLE CONDUIT ASSEMBLY AND METHOD OF MAKING SAME
Filed Jan. 30, 1929
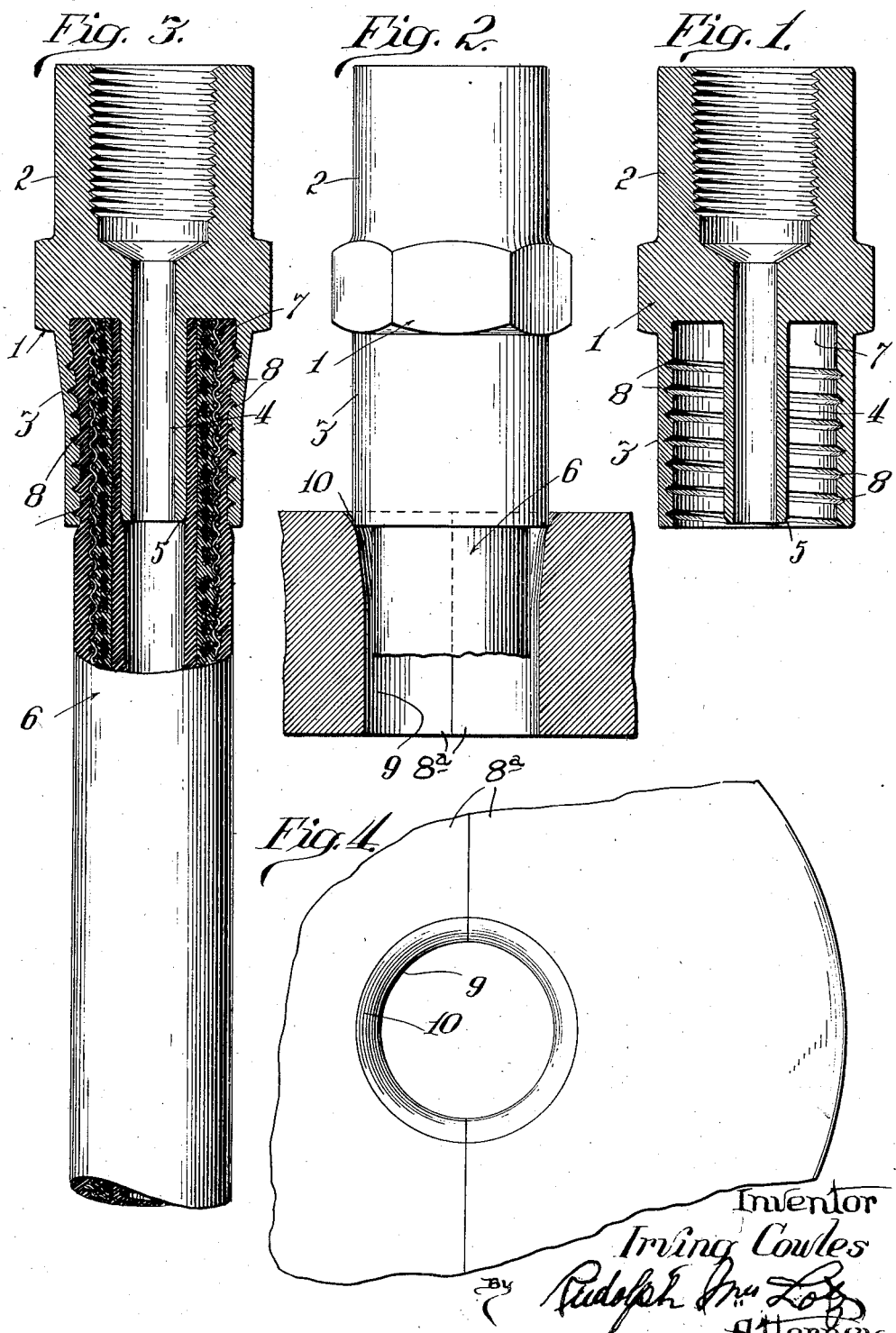

Patented Apr. 1, 1930

1,752,976

UNITED STATES PATENT OFFICE

IRVING COWLES, OF DETROIT, MICHIGAN, ASSIGNOR TO UNION BANK OF CHICAGO, TRUSTEE, OF CHICAGO, ILLINOIS, A CORPORATION OF ILLINOIS

FLEXIBLE CONDUIT ASSEMBLY AND METHOD OF MAKING SAME

Application filed January 30, 1929. Serial No. 336,072.

This invention has for its object to provide a very simple and efficient one-piece hose coupling for that type of flexible hose which is intended and adapted to withstand exceedingly high fluid pressures as, for example, five to ten thousand or more pounds per square inch, a further object of the invention being to provide a coupling of this character which is small, compact and cheap and which, when associated with an end of a flexible hose of the kind specified, will engage the same over a sufficient area and in such a manner as to insure a fluid-tight connection without rupturing the portion of the hose with which the coupling is engaged.

Hose of the type for which the coupling of my invention is intended and adapted consists broadly of an inner tube of rubber, an outer tube or casing of rubber and intermediate tubular structures composed of wire and fabric, generally braided, which are permeated by the rubber filler in the process of vulcanization, said filler being substanially homogeneous with the inner and outer tubes upon completion of vulcanization.

The prevention of leaks through the couplings of such hose results mainly from injury to the inner tube and from lack of sufficient length or area of hose engagement by the coupling and insufficient compressing of the wall of the tubing uniformly throughout the area of engagement by the coupling and failure to exert that pressure radially with respect to every minute portion of the engaged area. The manner of effecting compression of the hose wall when attaching the coupling has a great influence in the ultimate fluid tightness and durability of the hose as the application of the coupling pressure must be such as to avoid cutting into as opposed to compressing said wall on the one hand and as to displacement of the yieldable wall materials on the other hand.

Thus a very essential object of my invention is to provide a one piece coupling, the outer sleeve or shell of which is contracted upon the hose progressively from the outer to the inner end portions of said sleeve or shell so as to effect displacement of the wall materials of the flexible hose toward and at the extreme end portion of the hose instead of partly to the exterior and partly to the interior of said coupling as will be more fully understood from the following specification.

The invention is fully illustrated in the accompanying drawings wherein:

Fig. 1 is a central longitudinal section of a coupling constructed in accordance with my invention.

Fig. 2 is a side elevation of the same showing a piece of the flexible tubing associated therewith and the coupling disposed in engagement with a contracting die shown in section.

Fig. 3 is a central longitudinal section of the coupling contracted upon the hose.

Fig. 4 is a plan view of the contracting die employed.

The coupling is produced by automatic screw machines from hexagonal rods of suitable metal such as brass and comprises the hexagonal body portion 1, the internally threaded coupling portion 2 and the contractible coupling sleeve or shell 3 and stem 4 which are concentric with each other, the stem 4 connecting with the coupling portion 2. The latter may, obviously, be varied as desired to effect connection in various ways with a source of supply of or a receiver for the fluid to be forced through the hose, my invention residing in the portions 1, 3, and 4 of the structure.

The stem 4 is cylindrical and smooth, its free end being rounded along its outer corner as at 5 so that it may more readily enter the bore of the flexible hose 6 without rupturing the wall of said bore.

The sleeve or shell 3 is cylindrical both internally and externally and is sufficiently thick to withstand the maximum expanding pressure to which it is subjected by the engaged tubing and fluid after being contracted upon the hose. The annular space 7 between the sleeve or shell 3 and the stem 4 is preferably slightly less than the normal thickness of the wall of the hose 6 so that the latter must be forced into the said space 7. To facilitate this forcing, the sleeve or shell 3 is provided in its inner face with a helical groove 8 of relatively long pitch and of appreciable depth, the hose and coupling being rotated relatively to each other in initially associating the same, it being obviously also necessary that said elements are forced axially toward each other during such relative rotation.

After this association or assembly of hose and coupling has been effected so that the end of the hose abuts against the end wall of the annular space 7, the coupling is disposed upon the contracting die 8ª which consists of two abutting members suitably held against separation and having a central opening 9 the axis of which lies in the plane of the meeting faces of said members. This opening has a flared upper end or mouth portion 10, the diameter thereof below said flared mouth portion being substantially equal to the inner diameter of the sleeve or shell 3.

In Fig. 2 the coupling is shown in position on the die preparatory to contraction of the shell 3 by the latter. The die is preferably mounted in a punch press, the plunger of which engages the end of the coupling portion 2 and forces the same down into said die so that the sleeve or shell portion 3 is progressively contracted from its outer to its inner end portion, thus serving to effect displacement of the hose wall material toward the end of the hose against the end wall of the annular space 7 and the now flared inner end portion of the latter as shown in Fig. 3. Thus the contraction of the sleeve portion 3 in the instance illustrated is radially equal to its thickness, this degree being, obviously, variable to suit different flexible tube structures. The coupling is, of course, permanently associated with the hose and, when the latter is worn out or unfit for further use, is discarded with the same as junk.

The tubing structure shown may be taken as a diagrammatic rather than a true sectional view.

I have found in practice that compression of the sleeve or shell 3 by lateral pressure as by die members forced toward each other as in a vise and engaging the sleeve or shell 3 throughout that portion of its length to be contracted does not effect the same result in that it causes displacement of tube wall material mainly beyond the mouth of the coupling on the one hand and, because of the thickness of the sleeve or shell 3 effects distortion or fracture of the latter in that pressures are not distributed uniformly radially throughout the shell during contraction whereas in forcing the latter into the die shown effects the progressive and uniform radial pressure which prevents fracture and distortion.

It will be very obvious that under the influence of high fluid pressure, the tendency is for the hose and coupling to pull apart or be forced apart and that, therefore, engagement between the stem 4 and the inner tube of the hose covers such a very small area of contact as compared with the surface engagement between the outer hose surface and the shell 3 as to have small value as a resistant to separation of hose and coupling. Furthermore, because of the practically unyielding nature of the hose structure, the inner tube thereof can be expanded only slightly by insertion of the stem 4 without causing such a displacement of the material of said inner tube as may completely choke the bore of the hose just beyond the end of the stem 4. Consequently, the latter is required to have an inner diameter equal to that of the hose and an outer diameter of wall thickness as will be within the zone of expansion of the inner tube without effecting displacement of the rubber to choke or partially choke the hose. If the stem 4 were annularly grooved as in many existing hose couplings, it would necessarily have to be of a thicker wall with the result that the aforesaid displacement to choke the hose would take place. By reason of the method of effecting contraction of the shell 3, there will, obviously, also result a displacement of the rubber or other material of the inner tube of the hose toward the extreme end of the latter and against the end wall of the annular space 7. If the reinforcing material of the flexible hose consists of either braided wire or thread, it will be obvious that these braided structures will elongate under tension and will, therefore, elongate within the shell of the coupling as the latter is contracted as above described.

The compression of the hose end between the stem 4 and shell 3 must be uniform radially throughout in order to be most efficient. In some instances the inner tube of the hose is somewhat eccentric of the outer tube or casing. Practice has demonstrated that when the sleeve is contracted in the die as above described, this eccentricity is remedied by displacement of the yieldable hose wall structure, so to speak, to effect its redistribution. Where this eccentricity is very pronounced, the stem 4 bends slightly during the contraction of the shell 3 responsively to greater pressure on the thicker than on the diametrically opposite thinner hose wall to thus aid in equalizing the radial pressures throughout without disadvantage to the structure.

From the foregoing it will be apparent that the contracted coupling becomes a part of a unit comprising hose and couplings as a combination of elements since the coupling, when removed from the hose, is no longer a coupling, but just junk, consequently, I have in the appended claims, claimed the invention, in some instances as a unit comprising hose and coupling as a combination, since, obviously, the latter is destroyed by disassociating the two component elements.

Where the flexible hose is heavily reinforced with a braided wire tube and is to be used for low-pressure purposes, the stem 4 may be entirely omitted for the reason that the braided wire structure sufficiently resists radial contraction to permit such omission.

The stem 4 may be of the same or of greater length than the shell 3 but should not be appreciably shorter than the latter. If it is appreciably shorter than said shell 3, the radial contraction of the outer end portion of the latter may effect a radial contraction of the hose just beyond the outer end of the stem and cause a partial choking of the hose duct at this point.

The invention may also be defined as a method in that the contraction of the outer shell of the coupling is so effected as to cause practically all displacement of hose material in the direction of the extremity of the hose end contained within the coupling instead of outwardly from the mouth of the latter to thus eliminate bulge of the hose wall beyond the mouth of the coupling and to effect crowding thereof within the larger tapered portion of said coupling.

By reference to the drawings, it will be noted that contraction of the mouth portion of the shell extends over a length approximating the thickness of the hose wall thus producing a zone of compression of the latter amply sufficient to resist reaction of displaced hose wall material, crowded into the tapered inner end portion of the casing and causing the material crowded into the latter to form a substantially unyielding wedge or key to prevent withdrawal of the hose end from the coupling. The helical groove in the shell serves more particularly to permit initial forcing of the hose end into the coupling by relative rotation of the hose and coupling than to resist withdrawal of the hose from the coupling though said groove undoubtedly also functions in this respect.

I claim as my invention:

1. A flexible conduit comprising a flexible hose portion and a metallic coupling including means lying within the bore of the hose maintaining the latter in substantially normal condition against contracting pressure on the surrounding hose wall, a coupling body and an outer shell element rigid with said body, said shell element and said means defining an annular chamber having an end wall against which the hose end abuts, said annular chamber including a substantially cylindrical mouth portion of a length approximating the thickness of the hose wall and of less diameter than the outer diameter of the hose and said chamber including an inner tapered portion terminating at said end wall and of larger diameter than said mouth portion.

2. A flexible conduit adapted for high pressure service including the end portion of a flexible hose and a metallic coupling member associated therewith and comprising an inner tubular member of substantially uniform diameter throughout to approximately correspond with the normal bore of the hose and engage in the latter, a single rigid surrounding shell member concentric with said tubular member and cooperating therewith and with the coupling body to provide an annular chamber containing the hose end, said chamber having an elongated contracted mouth portion and an annularly enlarged tapered inner end portion, said mouth portion of said chamber being of appreciably smaller diameter than the hose end and the material of the latter displaced from the area of said smaller diameter mouth portion being contained within said enlarged portion of said chamber and completely filling the latter thereby providing an annularly enlarged and compressed hose wall extremity cooperating with said contracted mouth portion of said chamber to prevent withdrawal of the hose end from said coupling.

3. The method of assembling a flexible conduit comprising a piece of flexible hose and a metallic coupling for an end thereof, the coupling presenting a body portion, a tubular cylindrical inner member and an outer cylindrical shell member rigidly associated with said body member and conjointly with the latter and said inner member providing an annular cylindrical chamber adapted to receive and be completely filled by a hose end, which consists in inserting an end portion of the hose into said annular chamber to completely fill the latter from end to end, then progressively contracting said shell member annularly from its outer toward its inner end portion throughout an appreciable portion of its length to thereby compress the hose wall progressively upon said inner member and effect displacement of hose wall material within the zone of compression thereof toward and into the inner end portion of said annular chamber to thereby provide an excess of hose wall material within the portion of said annular chamber lying beyond said zone of compression.

IRVING COWLES.